United States Patent
Ozaki et al.

(10) Patent No.: US 12,521,915 B2
(45) Date of Patent: Jan. 13, 2026

(54) COMPOSITE MATERIAL PROCESSING APPARATUS AND COMPOSITE MATERIAL PROCESSING METHOD

(71) Applicant: MITSUBISHI HEAVY INDUSTRIES, LTD., Tokyo (JP)

(72) Inventors: Ryota Ozaki, Tokyo (JP); Koki Uchida, Tokyo (JP); Yuki Kani, Tokyo (JP); Sho Yamaguchi, Tokyo (JP); Shogo Otobe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/859,426

(22) Filed: Jul. 7, 2022

(65) Prior Publication Data
US 2023/0056264 A1 Feb. 23, 2023

(30) Foreign Application Priority Data
Aug. 18, 2021 (JP) .................................. 2021-133176

(51) Int. Cl.
*B29C 33/38* (2006.01)

(52) U.S. Cl.
CPC ...... *B29C 33/3807* (2013.01); *B29C 33/3828* (2013.01)

(58) Field of Classification Search
CPC . B29C 33/38; B29C 33/3807; B29C 33/3828; B29C 35/02
See application file for complete search history.

(56) References Cited

U.S. PATENT DOCUMENTS

| 6,146,576 A * | 11/2000 | Blackmore ........... B29C 66/496 425/389 |
| 7,396,494 B1 * | 7/2008 | Sueoka .................... B29C 70/14 428/374 |
| 2002/0130432 A1 | 9/2002 | Lukas et al. |

(Continued)

FOREIGN PATENT DOCUMENTS

| EP | 0335100 A2 | 10/1989 |
| JP | S61-041772 A | 2/1986 |

(Continued)

OTHER PUBLICATIONS

Japan Patent Office, "Office Action for Japanese Patent Application 2021-133176," Nov. 1, 2022.

(Continued)

*Primary Examiner* — John J DeRusso
*Assistant Examiner* — Shibin Liang
(74) *Attorney, Agent, or Firm* — HAUPTMAN HAM, LLP (57) ABSTRACT

An object is to suitably press a composite material. A processing apparatus 10 includes: a mold 11 having a pressing surface 11a configured to press a composite material 1 in which a resin and fibers are compounded; a cooling water pipe 12 configured to adjust the temperature of the composite material 1; and a graphite sheet 13 provided between the pressing surface 11a and the composite material 1 and deformed by pressing force from the mold 11, the graphite sheet 13 having higher thermal conductivity in a direction along the pressing surface than in a direction intersecting the pressing surface. The graphite sheet 13 is provided between the entire surface of the pressing surface 11a and the composite material 1.

4 Claims, 5 Drawing Sheets

(56) References Cited

U.S. PATENT DOCUMENTS

| | | |
|---|---|---|
| 2005/0014437 A1 | 1/2005 | Yoshida |
| 2014/0342030 A1* | 11/2014 | Nakatsuka ............ B29C 59/002 |
| | | 427/271 |
| 2020/0180244 A1* | 6/2020 | Shimizu .............. B29C 33/3842 |
| 2022/0266477 A1 | 8/2022 | Moriya et al. |

FOREIGN PATENT DOCUMENTS

| | | |
|---|---|---|
| JP | H06-026831 B2 | 4/1994 |
| JP | H06-278153 A | 10/1994 |
| JP | H09-277295 A | 10/1997 |
| JP | 2003-145567 A | 5/2003 |
| JP | 2003-170300 A | 6/2003 |
| JP | 2005-246722 A | 9/2005 |
| JP | 2013-028048 A | 2/2013 |
| JP | 5417631 B2 | 2/2014 |
| WO | 2022/044258 A1 | 3/2022 |

OTHER PUBLICATIONS

European Patent Office "Extended Search Report with Search Opinion for European Patent Application No. 22184673.6," Dec. 21, 2022.

* cited by examiner

COMPOSITE MATERIAL PROCESSING APPARATUS AND COMPOSITE MATERIAL PROCESSING METHOD

CROSS-REFERENCE TO RELATED APPLICATIONS

This application claims the benefit of priority to Japanese Patent Application Number 2021-133176 filed on Aug. 18, 2021. The entire contents of the above-identified application are hereby incorporated by reference.

BACKGROUND

1. Technical Field

The present disclosure relates to a composite material processing apparatus and a composite material processing method.

2. Description of Related Art

A composite material such as thermoplastic carbon fiber reinforced plastic (CFRP) may be used in aircraft components such as a fuselage, a main wing, or the like of an aircraft, for example. As a method for processing such a thermoplastic composite material into a desired shape, press molding is known (for example, Japanese Patent No. 5417631).

Japanese Patent No. 5417631 discloses a method for processing a material to be molded by using a pair of molding dies each having a step part formed such that the center part thereof is curved to be recessed downward. In this method, first, a material to be molded is set between the pair of molding dies and set in a state of being pressed at a predetermined distance. Next, the molding dies interposing the material to be molded are set in a heating pressor machine, and the material to be molded is pressed from both sides in the thickness direction of the material to be molded to perform a heating and pressing process. After the heating and pressing process is performed, the molding dies are taken out of the heating pressor machine and set in a cooling pressor machine, and the material to be molded is pressed from both sides in the thickness direction of the material to be molded to perform cooling and pressing process. In such a way, the material to be molded is solidified and completed as a molded product.

Japanese Patent No. 5417631 is an example of the related art.

BRIEF SUMMARY

In press molding of a thermoplastic composite material, it is important to evenly distribute the mold temperature in order to evenly distribute the composite material temperature. In the apparatus of Japanese Patent No. 5417631, however, the heating press die and a material to be molded are heated by a heater built in the heating press die. Further, the cooling press die is cooled by a cooling device. Thus, when the heating press die or the cooling press die (hereafter, referred to as a "mold") is heated or cooled, a part near the heater or the cooling device (hereafter, referred to as a "temperature adjustment device") is likely to be affected by the temperature adjustment device, and thus the temperature of such a part easily rises or falls. On the other hand, a part distant from the temperature adjustment device is less likely to be affected by the temperature adjustment device, and thus the temperature of such a part is less likely to rise or fall. This causes a temperature difference inside the mold in accordance with the distance from the temperature adjustment device. Therefore, variation of the temperature in the mold may be increased.

An uneven mold temperature will also cause variation of the temperature in a material to be molded (a composite material) to which the mold temperature is transferred. In particular, if a mold temperature becomes uneven during cooling of a composite material, the solidification process of the composite material becomes uneven depending on the location due to variation of the composite material temperature. An uneven solidification process of a composite material will cause a solidified part and a part where the composite material has not yet been solidified (hereafter, referred to as a "unsolidified part") to occur in the composite material. This causes the solidified part to come into contact with the mold, which prevents application of a pressure to the unsolidified part. This may cause a lack of pressurization or a contact failure between the composite material and the mold in the unsolidified part, and this may result in an inability of suitably pressing the composite material. Such an inability of suitably pressing the composite material may cause deterioration of the internal quality, such as a void or delamination, in a processed molded product. Further, deterioration of the surface quality, such as surface resin separation, may be caused.

Further, in welding thermoplastic composite materials with each other, it is important to evenly distribute the composite material temperature. When composite materials are welded together, the composite materials are heated. In this process, if the composite materials are not evenly heated, a part of the composite materials is melted early. Thus, a melted part and an unmelted part may occur. This causes the unmelted part to come into contact with the mold, which prevents application of a pressure to the melted part. This may cause a lack of pressurization or a contact failure between the composite material and the mold in the melted part, and this may result in an inability of suitably pressing the composite material. Such an inability of suitably pressing the composite material may cause deterioration of the internal quality, such as a void or delamination, in a processed molded product. Further, deterioration of the surface quality, such as surface resin separation, may be caused.

The present disclosure has been made in view of such circumstances and intends to provide a composite material processing apparatus and a composite material processing method that can suitably press a composite material.

To achieve the above object, the composite material processing apparatus and the composite material processing method of the present disclosure employ the following solutions.

A composite material processing apparatus according to one aspect of the present disclosure includes: a mold having a pressing surface configured to press a composite material in which a resin and fibers are compounded; a temperature adjustment unit configured to adjust a temperature of the composite material; and a buffer part provided between the pressing surface and the composite material and deformed by pressing force from the mold, the buffer part having higher thermal conductivity in a direction along the pressing surface than in a direction intersecting the pressing surface.

A composite material processing method according to one aspect of the present disclosure includes: pressing, by a pressing surface of a mold, a composite material in which a resin and fibers are compounded; and adjusting a temperature of the composite material by a temperature adjustment unit, and the pressing presses the composite material in a state where a buffer part deformed by pressing force from the mold is provided between the pressing surface and the composite material, the buffer part having higher thermal conductivity in a direction along the pressing surface than in a direction intersecting the pressing surface.

According to the present disclosure, it is possible to suitably press a composite material.

DETAILED DESCRIPTION

One embodiment of a composite material processing apparatus and a composite material processing method according to the present disclosure will be described below with reference to the drawings. In the following description, the direction in which a mold presses a composite material is referred to as a "pressing direction" or an "out-of-plane direction", and a direction intersecting the pressing direction is referred to as an "intersecting direction" or an "in-plane direction".

First Embodiment

The first embodiment of the present disclosure will be described below with reference to FIG. 1 and FIG. 2.

A processing apparatus 10 according to the present embodiment is an apparatus that molds a composite material 1 into a desired shape in order to manufacture a stringer, a spar, a frame, a rib, and the like that are aircraft components forming an aircraft structure, and the composite material 1 is the material thereof. Thus, the processing apparatus 10 is an apparatus that performs press molding on the composite material 1. An example of the composite material 1 to be processed may be, for example, carbon fiber reinforced plastic (CFRP) in which a thermoplastic resin and fibers are compounded. Specifically, the composite material 1 may be a laminated body of multi-layered fiber reinforced sheets in which a resin is impregnated into fibers. Note that the composite material 1 may be any composite material 1 in which fibers and a resin are compounded and is not limited to thermoplastic carbon fiber reinforced plastic. The composite material 1 may be a thermosetting composite material 1, for example.

[Processing Apparatus 10]

Figure 1:
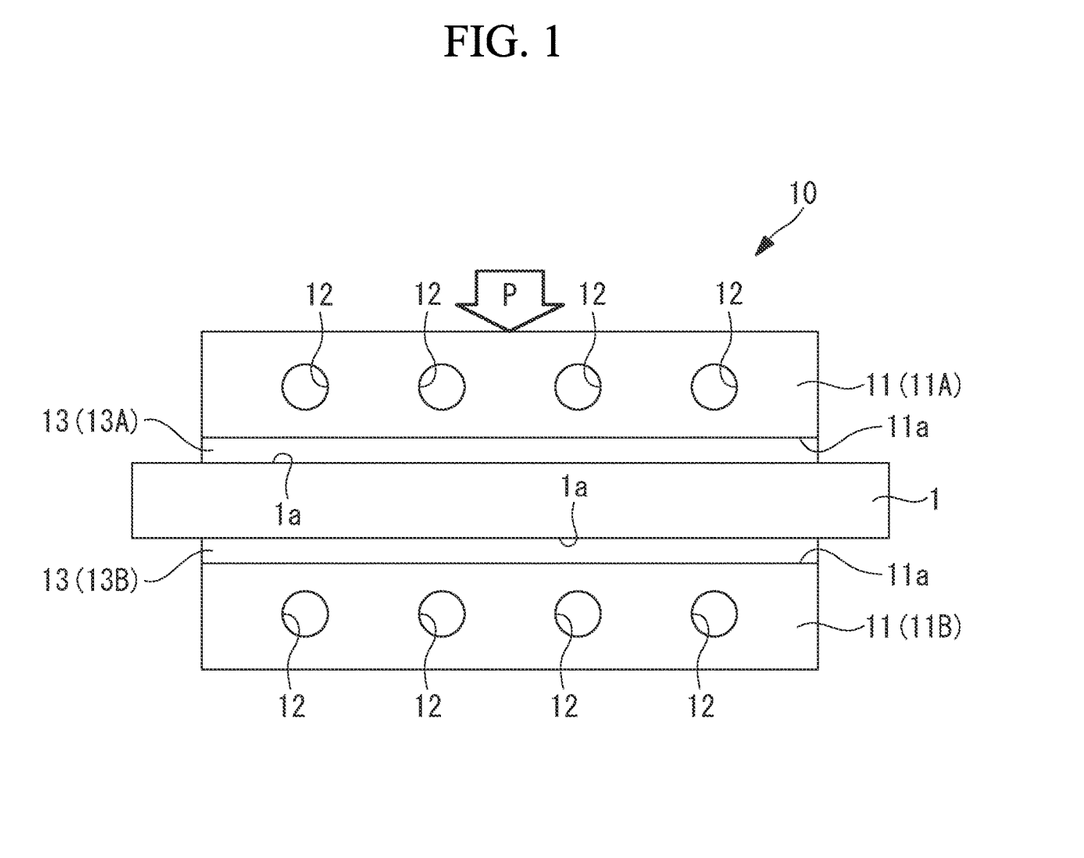
FIG. 1 is a schematic side view illustrating a processing apparatus and a composite material according to a first embodiment of the present disclosure and illustrates a state before pressing force works on the composite material.
Figure 2:
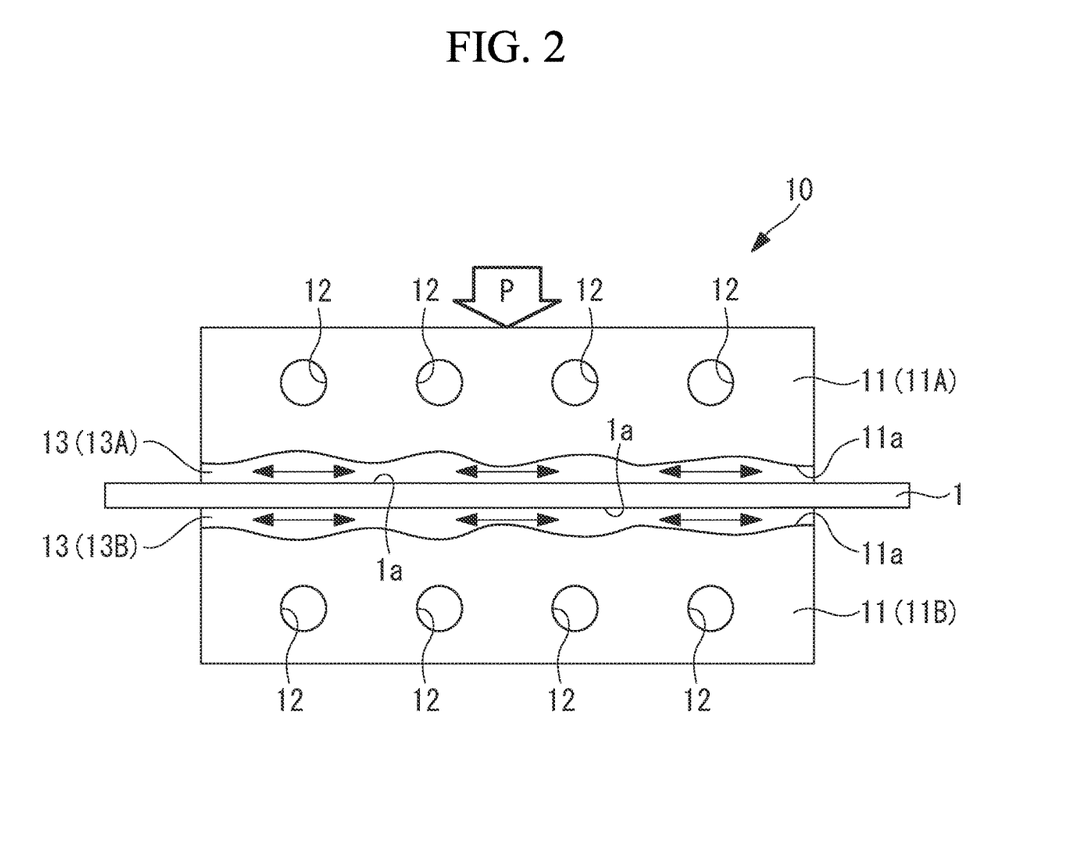
FIG. 2 is a schematic side view illustrating the processing apparatus and the composite material according to the first embodiment of the present disclosure and illustrates a state where pressing force is working on the composite material.

As illustrated in FIG. 1 and FIG. 2, the processing apparatus 10 for the composite material 1 according to the present embodiment includes molds 11 that press the composite material 1, cooling water pipes (a temperature adjustment unit) 12 built in the molds 11, a pressing device (not illustrated) that presses the molds 11, and graphite sheets (a buffer part) 13 provided between the molds 11 and the composite material 1.

The molds 11 have a first mold 11A arranged on one side in the pressing direction of the composite material 1 and a second mold 11B arranged on the other side in the pressing direction of the composite material 1. The first mold 11A and the second mold 11B are arranged so as to interpose the composite material 1. In the present embodiment, the first mold 11A and the second mold 11B have substantially the same configuration. Thus, the first mold 11A and the second mold 11B will be described simply as a "mold 11" in the following description except for a case where the first mold 11A and the second mold 11B are required to be separately described.

The mold 11 is formed of a metal material. An example of the metal material forming the mold 11 may be, for example, carbon steel such as S50C, alloy steel such as SUS304, or invar. In the mold 11, the surface on the side where the composite material 1 is arranged is a pressing surface 11a. In the present embodiment, the pressing surface 11a is a flat plane. Further, the graphite sheet 13 is attached to the pressing surface 11a so as to cover the entire region.

The pressing device moves the first mold 11A in the direction of the second mold 11B as indicated by the arrow P in FIG. 1 and FIG. 2. Thus, the pressing device moves the mold 11 so that the pressing surface 11a presses the composite material 1. The composite material 1 is pressed and deformed between the first mold 11A and the second mold 11B by drive force from the pressing device. Note that the pressing device may move both the first mold 11A and the second mold 11B so that the first mold 11A and the second mold 11B come closer to each other.

Cooling water flows inside the cooling water pipes 12. A plurality of cooling water pipes 12 are provided so as to be embedded in the mold 11. Each of the cooling water pipes 12 extends in the intersecting direction (the depth direction in the drawing sheet of FIG. 1 and FIG. 2). The plurality of cooling water pipes 12 are aligned at predetermined intervals in the intersecting direction (the lateral direction in the drawing sheet of FIG. 1 and FIG. 2). The cooling water pipes 12 cool the mold 11 with cooling water flowing inside the cooling water pipes 12. Specifically, the cooling water pipes 12 cool the composite material 1 via the mold 11, the graphite sheet 13, and the like.

Further, a plurality of heaters (not illustrated) for heating the mold 11 are built in the mold 11 in the same manner as the cooling water pipes 12. The plurality of heaters (a temperature adjustment unit) are aligned at predetermined intervals in the intersecting direction in the same manner as the cooling water pipes 12. The heaters heat the mold 11. Specifically, the heaters heat the composite material 1 via the mold 11, the graphite sheet 13, and the like. Examples of the heaters include a heating wire that generates heat with current conduction.

The graphite sheets 13 include a first graphite sheet 13A attached to the pressing surface 11a of the first mold 11A and a second graphite sheet 13B attached to the pressing surface 11a of the second mold 11B. Since the first graphite sheet 13A and the second graphite sheet 13B have the same configuration, the first graphite sheet 13A and the second graphite sheet 13B will be described simply as a "graphite sheet 13" in the following description except for a case where the first graphite sheet 13A and the second graphite sheet 13B are required to be separately described.

The graphite sheet 13 is a sheet-like member. One surface of the graphite sheet 13 is in surface contact with the pressing surface 11a of the mold 11. Further, the other surface of the graphite sheet 13 is in contact with the contact surface 1a of the composite material 1. Herein, the contact surface 1a of the composite material 1 is a surface of the surfaces of the composite material 1 which is subjected to pressing force from the mold 11 via the graphite sheet 13 and the like. Note that a metal plate (not illustrated) formed of a metal material may be provided between the graphite sheet 13 and the composite material 1. By providing the metal plate, it is possible to reduce damage on the graphite sheet 13 and thus increase the lifetime of the graphite sheet 13. Further, it is possible to improve the quality of the processed composite material 1. The metal plate may be formed of the same material as the mold 11.

The graphite sheet 13 has flexibility. Specifically, the graphite sheet 13 is flexible enough to be deformed in accordance with the shapes of the pressing surface 11a of the mold 11 and the contact surface 1a of the composite material 1 by pressing force from the mold 11. The graphite sheet 13 has higher flexibility than the mold 11 and the solidified composite material 1.

In general, the graphite sheet 13 has high thermal conductivity particularly in a direction along the surface. On the other hand, the thermal conductivity in a direction intersecting the direction along the surface (thickness direction) is low. In the following description, the direction exhibiting high thermal conductivity is referred to as a "main thermal conduction direction". In the graphite sheet 13 used in the present embodiment, the main thermal conduction direction is the in-plane direction as indicated by arrows in FIG. 2. Thus, the thermal conductivity in the out-of-plane direction is lower than that in the in-plane direction.

The graphite sheet 13 has a thickness to the degree that the graphite sheet 13 is suitably deformed and the temperature is evenly distributed in the in-plane direction. Specifically, in the present embodiment, the thickness of the graphite sheet 13 is greater than or equal to 0.1 mm and less than or equal to 5 mm as an example. Note that the above thickness of the graphite sheet 13 is one example and is not limited to the numerical value described above. The thickness may be less than 0.1 mm or may be greater than 5 mm. Further, when a member other than the graphite sheet 13 is used as a buffer material (for example, when a laminated member 41 described later is used as a buffer material), the thickness of the buffer material is greater than or equal to 0.1 mm and less than or equal to 20 mm as an example. Note that the above thickness of the buffer material is one example and is not limited to the numerical value described above. The thickness may be less than 0.1 mm or may be greater than 20 mm.

Further, the graphite sheet 13 is elastically deformed by pressing force from the mold 11 and recovers the original shape when the pressing force no longer works thereon. Accordingly, the graphite sheet 13 can be repeatedly used.

[Processing Method]

Next, the processing method for the composite material 1 will be described.

First, the graphite sheets 13 are attached to the pressing surfaces 11a of the molds 11 (the first mold 11A and the second mold 11B). Note that the graphite sheet 13 can be repeatedly used as described above, and therefore, if the graphite sheets 13 have already been attached, the attaching step is unnecessary.

Next, the mold 11 is heated by a heater so as to reach a predetermined temperature (a temperature adjustment step). Next, as illustrated in FIG. 1, the composite material 1 is set between the first mold 11A and the second mold 11B that are in a heated state. While the method of setting is not particularly limited, the composite material 1 is placed, for example, on the upper surface of the second graphite sheet 13B attached to the pressing surface 11a of the second mold 11B, and thereby the composite material 1 is set.

After the composite material 1 is set, the first mold 11A is moved in the direction of the second mold 11B by the pressing device to press the composite material 1 as indicated by the arrow P in FIG. 1 (a pressing step). As described above, the molds 11 are in the heated state, and thus the composite material 1 will be pressed while being heated by the heat of the molds 11.

Further, in this state, the graphite sheet 13 is provided between each mold 11 and the composite material 1, and thus the graphite sheets 13 are deformed in accordance with the shapes of the pressing surfaces 11a of the molds 11 and the contact surfaces 1a of the composite material 1, as illustrated in FIG. 2. Specifically, a surface of the graphite sheet 13 which is in contact with the pressing surface 11a is deformed in accordance with the shape of the pressing surface 11a, and a surface of the graphite sheet 13 which is in contact with the contact surface 1a is deformed in accordance with the shape of the contact surface 1a. Accordingly, even when the pressing surfaces 11a of the molds 11 and the contact surfaces 1a of the composite material 1 are deformed due to heat, the entire contact surfaces 1a of the composite material 1 can be evenly pressurized. In such a way, the composite material 1 is pressed in a heated state and thereby deformed into a desired shape (see FIG. 1 and FIG. 2).

Next, cooling water is passed through the cooling water pipes 12 to cool the molds 11 so as to reach a predetermined temperature (the temperature adjustment step). Accordingly, the composite material 1 is cooled while being pressurized, and is solidified in a pressurized state. Once the composite material 1 is solidified, the pressing of the mold 11 against the composite material 1 is stopped. The composite material 1 is then taken out of the mold 11, and the processing ends.

According to the present embodiment, the following effects and advantages are achieved.

In the present embodiment, the temperature adjustment devices such as the cooling water pipes 12 and the heater are provided in the mold 11. When the temperature adjustment device heats or cools the mold 11 in order to adjust the temperature of the mold 11, a part near the temperature adjustment device is likely to be affected by a temperature change caused by the temperature adjustment device, and thus the temperature of such a part easily rises or falls. On the other hand, a part distant from the temperature adjustment device is less likely to be affected by a temperature change caused by the temperature adjustment device, and thus the temperature of such a part is less likely to rise or fall. Thus, a temperature difference in accordance with the distance from the temperature adjustment device occurs inside the mold 11. Accordingly, a difference in thermal expansion may occur inside the mold 11, and the pressing surface 11a may be deformed.

In the present embodiment, the graphite sheet 13 deformed by pressing force from the mold 11 is provided between the pressing surface 11a and the composite material 1. Thus, even when the pressing surface 11a is deformed, the graphite sheet 13 is deformed in accordance with the shape of the pressing surface 11a by the pressing force of the mold 11. Therefore, the pressing force working on the composite material 1 can be evenly distributed, and the composite material 1 can be suitably pressed. Thus, the quality of the processed composite material 1 can be improved.

Further, the composite material 1 is heated by the heat from the mold 11, and thereby the contact surface 1a of the composite material 1 may be deformed, for example. Even in such a case, the graphite sheet 13 is deformed in accordance with the shape of the contact surface 1a by the pressing force of the mold 11. Accordingly, contact between the contact surface 1a and the graphite sheet 13 may be well maintained. Therefore, the composite material 1 can be suitably pressed.

Further, in the present embodiment, the main thermal conduction direction of the graphite sheet 13 is the in-plane direction. Accordingly, heat is transferred in the in-plane direction in the graphite sheet 13 before transferred to the composite material 1 (see arrows in FIG. 2). Accordingly, the temperature can be evenly distributed in the in-plane direction in the graphite sheet 13. Therefore, the heat evenly distributed by the graphite sheet 13 is transferred to the composite material 1. Thus, the heat transferred to the composite material 1 via the graphite sheet 13 can be evenly distributed in the in-plane direction. This can uniform a degree of solidification of the composite material 1 in the in-plane direction. Thus, it may possible to avoid a situation where a part of the composite material 1 is earlier solidified to reduce pressing force working on another part. Thus, pressing force working on the composite material 1 can be evenly distributed, and the composite material 1 can be suitably pressed.

Further, in the present embodiment, the graphite sheet 13 is provided so as to cover the entire region of the pressing surface 11a. Thus, the graphite sheet 13 is provided between the entire region of the pressing surface 11a and the composite material 1. This enables pressing force working on the composite material 1 to be evenly distributed over the entire region of the pressing surface 11a. Therefore, the composite material 1 can be more suitably pressed.

Second Embodiment

Next, a processing apparatus 20 according to the second embodiment of the present disclosure will be described with reference to FIG. 3.

The processing apparatus 20 according to the present embodiment is an apparatus for welding composite materials to each other. Specifically, as illustrated in FIG. 3, the processing apparatus 20 is an apparatus for welding a first composite material 31 arranged on a tool 24 with a second composite material 32 placed on the first composite material 31 via a resistive element 25. The first composite material 31 is larger than the second composite material 32 in plan view.

The processing apparatus 20 according to the present embodiment includes the tool 24 on which the first composite material 31 is placed, the resistive element 25 arranged between the first composite material 31 and the second composite material 32, a mold 21 configured to press the second composite material 32, and a graphite sheet 23 provided between a pressing surface 21a of the mold 21 and the second composite material 32. Further, a metal plate may be provided between the second composite material 32 and the graphite sheet 23 in the same manner as in the first embodiment. Since the graphite sheet 23 has the same configuration as the graphite sheet 13 described in the first embodiment, the detailed description thereof will be omitted. Further, the mold 21 is substantially the same as the first mold 11A described in the first embodiment but is different in that no cooling pipe is provided in the mold 21 of the present embodiment.

The resistive element 25 is provided between a welding surface 31a of the first composite material 31 and a welding surface 32a of the second composite material 32. A positive electrode 26 and a negative electrode 27 are attached to respective ends in the intersecting direction of the resistive element 25, and conduction of current from the positive electrode 26 to the negative electrode 27 generates heat. Due to this heat, the welding surface 31a of the first composite material 31 and the welding surface 32a of the second composite material 32 are welded together.

Next, the processing method (welding method) of the first composite material 31 and the second composite material 32 will be described. Note that description for the same step as that in the processing method of the first embodiment will be omitted.

First, the graphite sheet 23 is attached to the pressing surface 21a of the mold 21. Note that the graphite sheet 23 can be repeatedly used, and therefore, if the graphite sheet 23 has already been attached, the attaching step is unnecessary.

Figure 3:
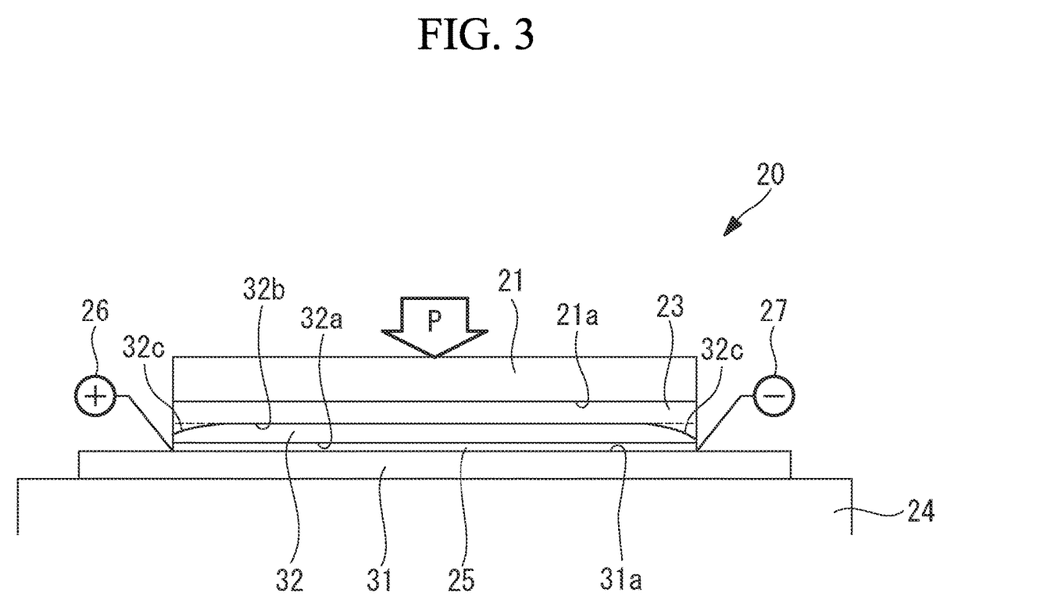
FIG. 3 is a schematic side view illustrating a processing apparatus and a composite material according to a second embodiment of the present disclosure.

Next, as illustrated in FIG. 3, the first composite material 31, the second composite material 32, and the resistive element 25 are set on the upper surface of the tool 24. The method of setting is not particularly limited. For example, respective members are set such that the first composite material 31 is placed, the resistive element 25 is placed on the upper surface (welding surface 31a) of the first composite material 31, and the second composite material 32 is placed on the resistive element 25.

After respective members are set, as indicated by the arrow P in FIG. 3, the mold 21 is moved in the direction of the tool 24 by the pressing device (not illustrated) to press the second composite material 32 (a pressing step). Further, in this step, the resistive element 25 is generating heat. Thus, the welding surface 31a of the first composite material 31 and the welding surface 32a of the second composite material 32 are heated and melted by the heat of the resistive element 25 (a temperature adjustment step).

In the pressing step, the graphite sheet 23 is provided between the mold 21 and the second composite material 32. Thus, in the same manner as in the first embodiment, even when the pressing surface 21a of the mold 21 and the contact surface 32b of the second composite material 32 are deformed due to heat, the entire region of the contact surface 32b of the second composite material 32 can be evenly pressurized. In particular, as indicated by dashed lines in FIG. 3, the end 32c in the in-plane direction of the second composite material 32 is likely to be deformed such that the plate thickness decreases due to outflow of the resin; however, the graphite sheet 23 is deformed in accordance with the contact surface 32b of the second composite material 32, and it is thus possible to suitably press even the end 32c of the second composite material 32.

Next, heat generation of the resistive element 25 provided between the first composite material 31 and the second composite material 32 is stopped. Accordingly, the first composite material 31 and the second composite material 32 are cooled while being pressurized. Accordingly, the first composite material 31 and the second composite material 32 are solidified in the pressurized state. The first composite material 31 and the second composite material 32 are thereby welded together. After the first composite material 31 and the second composite material 32 are welded together, pressing of the mold 21 against the second composite material 32 is stopped. The member of the welded first composite material 31 and second composite material 32 is then detached from above the tool 24, and the processing ends.

In the present embodiment, the following effects and advantages are achieved.

A problem is brought by the fact that the composite material temperature is unevenly distributed not only during press molding but also during weld between composite materials. Specifically, when heated by the resistive element 25, the first composite material 31 and the second composite material 32 are not evenly heated, and this results in partial earlier weld. Thus, a melted part and an unmelted part occur. This causes the unmelted part to come into contact with the mold 21, which prevents application of a pressure to the melted part. This may cause a situation where pressing force working on the melted part is reduced.

On the other hand, in the present embodiment, the graphite sheet 23 is provided so as to come into contact with the second composite material 32. The graphite sheet 23 well transfers heat in the in-plane direction. Thus, heat transferred to the graphite sheet 23 from the second composite material 32 is transferred in the in-plane direction of the graphite sheet 23. In such a way, the temperature in the in-plane direction can be evenly distributed in the graphite sheet 23. Therefore, the temperature of the first composite material 31 and the second composite material 32 can be evenly distributed in the in-plane direction.

Further, in the present embodiment, since the graphite sheet 23 is deformed in accordance with the contact surface 32b of the second composite material 32 as described above, the entire region of the contact surface 32b of the second composite material 32 can be evenly pressurized. As such, pressing force working on the second composite material 32 can be evenly distributed, and the second composite material 32 can be suitably pressed. Thus, the quality of the processed composite material 1 can be improved.

Modified Example

Figure 4:
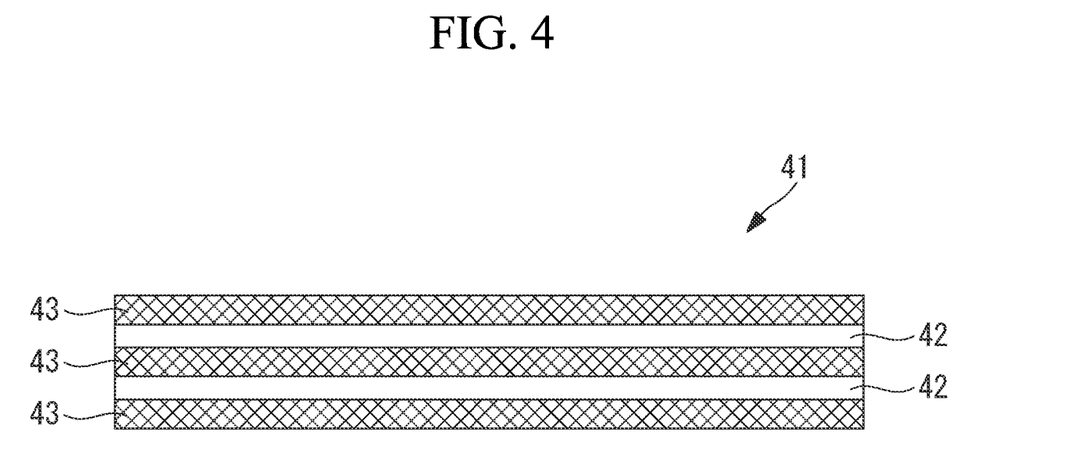
FIG. 4 is a schematic side view illustrating a laminated member applied to a processing apparatus according to a modified example of the present disclosure.

Although the example in which the graphite sheet 13 is provided between the mold 11 and the composite material 1 has been described in the above first embodiment, the member provided between the mold 11 and the composite material 1 is not limited thereto. Such a member may be any member that is flexible enough to be deformed by pressing force and whose main thermal conduction direction is the in-plane direction and may be formed of a material other than the graphite sheet 13. Further, for example, the member may be a laminated member 41 in which a plurality of members having different thermal conductivity are combined, as illustrated in FIG. 4.

For example, the laminated member 41 has metal plates (a first member) 42 and heat-resistant fiber cloths (a second member) 43 that are alternatingly laminated. The metal plates 42 and the heat-resistant fiber cloths 43 are laminated in the pressing direction with the laminated member 41 being attached to the mold 11. The one end and the other end in the pressing direction of the laminated member 41 according to the present embodiment are provided with the heat-resistant fiber cloths 43. Thus, the laminated member 41 is formed such that the mold 11 and the composite material 1 come into contact with the heat-resistant fiber cloths 43.

The metal plate 42 is a thin plate-like member. The metal plate 42 is formed of a metal material having high thermal conductivity, such as copper or aluminum, for example. The material of the metal plate 42 is not particularly limited and is preferably formed of a material having higher thermal conductivity than the mold 11. The heat-resistant fiber cloth 43 is a member in which heat-resistant fibers are formed into a cloth shape. The heat-resistant fiber is a glass fiber, for example. The heat-resistant fiber cloth 43 has lower thermal conductivity than the metal plate 42.

Figure 5:
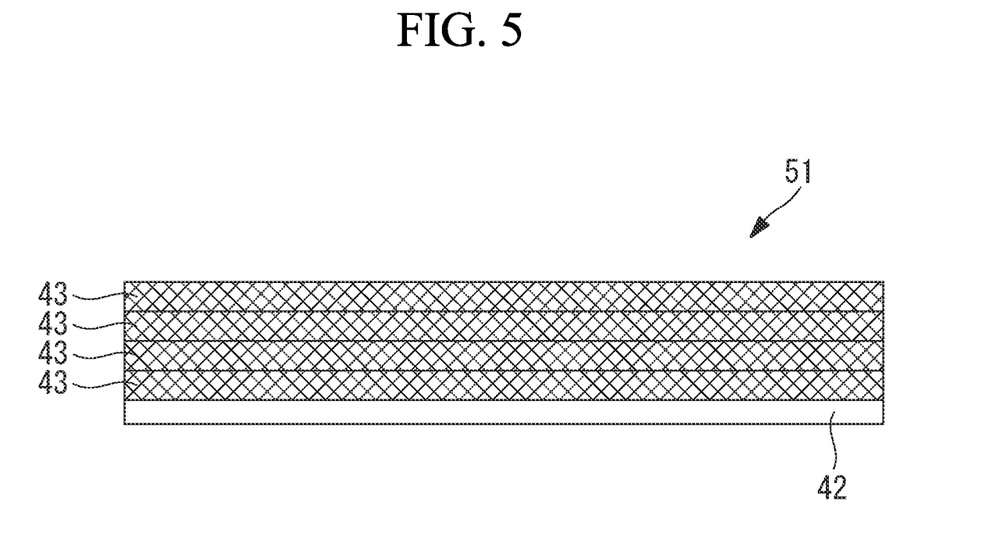
FIG. 5 is a schematic side view illustrating a laminated member applied to a processing apparatus according to a modified example of the present disclosure.

Note that, although the example in which the heat-resistant fiber cloths 43 and the metal plates 42 are alternatingly laminated has been described above, the configuration of the laminated member is not limited to such a configuration. For example, as with a laminated member 51 illustrated in FIG. 5, a plurality of heat-resistant fiber cloths 43 may be successively laminated to form a laminated body of the heat-resistant fiber cloths, and the metal plate 42 may be laminated on one end or the other end in the pressing direction of the laminated body of the heat-resistant fiber cloths 43. In such a case, for example, a laminated body of the heat-resistant fiber cloths 43 may be arranged on the mold 11 side, and the metal plate 42 may be arranged on the composite material 1 side.

According to the present modified example, the following effects and advantages are achieved.

In the present modified example, heat of the mold 11 is well transferred in the in-plane direction in the metal plate 42 having higher thermal conductivity. Further, the heat is less transferred in the out-of-plane direction (laminated direction) by the heat-resistant fiber cloth 43 having lower thermal conductivity. Therefore, the temperature in the in-plane direction can be evenly distributed in the laminated member 41 before heat is transferred to the composite material 1. Thus, pressing force working on the composite material 1 can be evenly distributed, and the composite material 1 can be suitably pressed.

Further, the laminated member 41 is formed of the thin metal plates 42 and the flexible heat-resistant fiber cloths 43 and thus can be suitably deformed by the pressing force from the mold 11 in accordance with deformation of the pressing surface 11a and the contact surface 1a.

Note that it is of course possible to apply the laminated member 41 instead of the graphite sheet 23 of the second embodiment.

Note that the present disclosure is not limited to only the configuration of each of the above embodiments, and modification or improvement can be suitably applied within the scope not departing from the spirit of the present disclosure. An embodiment with application of such modification or improvement is also included in the protection scope of the present disclosure.

For example, although the case where the plate-like composite material 1 is molded by press molding has been described in the above first embodiment, the present disclosure is not limited thereto. For example, the processing apparatus according to the present disclosure may be used when a composite material is molded by press molding so that the cross-sectional shape taken along a plane orthogonal to the longitudinal direction is shaped into an L-shape, a Z-shape, or a hat shape. In such a case, the pressing surface of the mold has a shape in accordance with the shape of the molded composite material. Further, the graphite sheet or the laminated member also have a shape in accordance with the shape of the pressing surface and the molded composite material.

Further, although the example in which the graphite sheets 13 are provided in both of the pressing surface 11a of the first mold 11A and the pressing surface 11a of the second mold 11B has been described in the above first embodiment, the present disclosure is not limited thereto. The graphite sheet may be provided in either one of the pressing surface 11a of the first mold 11A or the pressing surface 11a of the second mold 11B.

Further, although the example in which the composite material 1 is heated and cooled by the same mold 11 has been described in the above first embodiment, the present disclosure is not limited thereto. The mold used for performing heating and the mold used for performing cooling may be separate molds. In such a case, the graphite sheet 13 or the laminated member 41 is provided in a mold used for performing heating and/or a mold used for performing cooling.

Further, although the case where the plate-like first composite material 31 and the plate-like second composite material 32 are welded together has been described in the above second embodiment, the present disclosure is not limited thereto. The processing apparatus according to the present disclosure may be used when composite materials are welded so that the cross-sectional shape taken along a plane orthogonal to the longitudinal direction is shaped into an L-shape, a Z-shape, or a hat shape.

Further, although the example in which the graphite sheet 13, 23 or the laminated member 41 is provided so as to cover the entire region of the pressing surface 11a, 21a of the mold 11, 21 has been described in each of the above embodiments, the present disclosure is not limited thereto. The graphite sheet 13, 23 or the laminated member 41 may be provided to cover only a part of the pressing surface 11a, 21a of the mold 11, 21.

Further, although the example in which a metal plate is provided between the graphite sheet and the mold has been described in each of the above embodiments, the present disclosure is not limited thereto. For example, nothing may be provided between the graphite sheet and the mold, and thus, the graphite sheet and the mold may be in direct contact with each other. Further, a member other than a metal plate may be provided between the graphite sheet and the mold. The member other than the metal plate may be a polyimide film, for example.

The composite material processing apparatus and the composite material processing method according to the embodiments described above are understood as follows, for example.

The composite material processing apparatus according to one aspect of the present disclosure includes: a mold (11, 21) having a pressing surface (11a, 21a) configured to press a composite material (1, 31, 32) in which a resin and fibers are compounded; a temperature adjustment unit (12, 25) configured to adjust a temperature of the composite material; and a buffer part (13, 23, 41) provided between the pressing surface and the composite material and deformed by pressing force from the mold, the buffer part having higher thermal conductivity in a direction along the pressing surface than in a direction intersecting the pressing surface.

In the above configuration, thermal conductivity is higher in a direction along the pressing surface (hereafter, referred to as an "in-plane direction") than in a direction intersecting the pressing surface (hereafter, referred to as an "out-of-plane direction"). Accordingly, heat of the composite material is transferred to the buffer part and transferred in the in-plane direction in the buffer part. Accordingly, the temperature can be evenly distributed in the in-plane direction in the buffer part. Therefore, the heat evenly distributed by the buffer part is transferred to the composite material. Thus, the temperature of the composite material can be evenly distributed in the in-plane direction. This can uniform a degree of solidification of the composite material in the in-plane direction. Thus, it may be possible to avoid a situation where a part of the composite material is solidified to reduce pressing force working on another part. Thus, pressing force working on the composite material can be evenly distributed, and the composite material can be suitably pressed.

Further, for example, the composite material is heated by the heat from the mold, and thereby a surface of the composite material in contact with the buffer part (hereafter, referred to as a "contact surface") may be deformed. Even in such a case, the buffer part is deformed in accordance with the shape of the contact surface by the pressing force of the mold. Accordingly, contact between the contact surface and the buffer part may be well maintained. Therefore, the composite material can be suitably pressed.

The temperature adjustment unit is provided in the mold.

In the above configuration, the temperature adjustment unit is provided in the mold. When the temperature adjustment unit heats or cools the mold in order to adjust the temperature of the mold, a part near the temperature adjustment unit is likely to be affected by a temperature change caused by the temperature adjustment unit, and thus the temperature of such a part is likely to rise or fall. On the other hand, a part distant from the temperature adjustment unit is less likely to be affected by a temperature change caused by the temperature adjustment unit, and thus the temperature of such a part is less likely to rise or fall. Thus, a temperature difference in accordance with the distance from the temperature adjustment unit occurs inside the mold. Accordingly, a difference in thermal expansion may occur inside the mold, and the pressing surface may be deformed.

In the above configuration, the buffer part deformed by pressing force from the mold is provided between the pressing surface and the composite material. Thus, even when the pressing surface is deformed, the buffer part is deformed in accordance with the shape of the pressing surface by the pressing force of the mold. Therefore, the pressing force working on the composite material can be evenly distributed, and the composite material can be suitably pressed. Thus, the quality of the processed composite material can be improved.

Further, in the composite material processing apparatus according to one aspect of the present disclosure, the buffer part has a graphite sheet (13).

The graphite sheet has high thermal conductivity in the in-plane direction and has low thermal conductivity in the out-of-plane direction (direction orthogonal to the in-plane direction). Therefore, the temperature in the in-plane direction can be evenly distributed in the graphite sheet before heat is transferred to the composite material. Thus, pressing force working on the composite material can be evenly distributed, and the composite material can be suitably pressed.

Further, in the composite material processing apparatus according to one aspect of the present disclosure, the buffer part has a laminated member (41) in which a first member (42) and a second member (43) having different thermal conductivity from the first member are laminated in the pressing direction.

In the above configuration, the buffer part has a laminated member in which the first member and the second member, which has lower thermal conductivity than the first member, are laminated in the pressing direction. Accordingly, heat of the mold is well transferred in the in-plane direction in the first member having higher thermal conductivity. Further, the heat is less transferred in the out-of-plane direction (laminated direction) by the second member having lower thermal conductivity. Therefore, the temperature in the in-plane direction can be evenly distributed in the laminated member before heat is transferred to the composite material. Thus, pressing force working on the composite material can be evenly distributed, and the composite material can be suitably pressed.

Further, in the composite material processing apparatus according to one aspect of the present disclosure, the buffer part is provided between the entire region of the pressing surface of the mold and the composite material.

In the above configuration, the buffer part is provided between the entire region of the pressing surface and the composite material. This enables pressing force working on the composite material to be evenly distributed over the entire region of the pressing surface. Therefore, the composite material can be more suitably pressed.

Further, the composite material processing method according to one aspect of the present disclosure includes: a pressing step of pressing, by a pressing surface (11a, 21a) of a mold (11, 21), a composite material (1, 31, 32) in which a resin and fibers are compounded; and a temperature adjustment step of adjusting a temperature of the composite material by a temperature adjustment unit (12, 25), and the pressing step presses the composite material in a state where a buffer part (13, 23, 41) deformed by pressing force from the mold is provided between the pressing surface and the composite material, the buffer part having higher thermal conductivity in a direction along the pressing surface than in a direction intersecting the pressing surface.

LIST OF REFERENCES

1: composite material
10: processing apparatus
11: mold
11A: first mold
11B: second mold
11a: pressing surface
12: cooling water pipe (temperature adjustment unit)
13: graphite sheet
13A: first graphite sheet
13B: second graphite sheet
20: processing apparatus
21: mold
21a: pressing surface:
23: graphite sheet
24: tool
25: resistive element (temperature adjustment unit)
26: positive electrode
27: negative electrode
31: first composite material
31a: welding surface
32: second composite material
32a: welding surface
32b: contact surface
32c: end
41: laminated member
42: metal plate (first member)
43: heat-resistant fiber cloth (second member)

What is claimed is:

1. A composite material processing method for welding a plurality of composite materials with each other in which a resin and fibers are compounded, the method comprising:
    attaching a buffer part to a pressing surface of a mold,
        the buffer part having higher thermal conductivity in a direction along the pressing surface than in a direction intersecting the pressing surface, and
        the buffer part having flexibility so as to be elastically deformed in a pressing direction of the mold, by pressing force from the mold, in accordance with a shape of the pressing surface of the mold and a contact surface of a composite material of the plurality of composite materials;
    pressing, by the pressing surface of the mold, the composite material; and
    adjusting a temperature of the plurality of composite materials by a heat generation of a resistive element, which is different from the buffer part and is arranged between the plurality of composite materials, the resistive element generating heat when a current flows through the resistive element,
    wherein the pressing presses the composite material in a state where the buffer part is provided between the pressing surface and the composite material, and
    wherein the buffer part is provided between an entire region of the pressing surface of the mold and the composite material.

2. The composite material processing method according to claim 1, wherein the buffer part includes a graphite sheet.

3. The composite material processing method according to claim 1, wherein the buffer part includes a laminated member in which a first member and a second member having different thermal conductivity from the first member are laminated in the pressing direction.

4. The composite material processing method according to claim 1, wherein an entire region of the contact surface of the composite material is evenly pressurized.

* * * * *